(12) United States Patent
Stubler et al.

(10) Patent No.: US 6,711,291 B1
(45) Date of Patent: Mar. 23, 2004

(54) METHOD FOR AUTOMATIC TEXT PLACEMENT IN DIGITAL IMAGES

(75) Inventors: Peter O. Stubler, Rochester, NY (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/398,221

(22) Filed: Sep. 17, 1999

(51) Int. Cl.[7] .............................. G06K 9/46; G06K 9/34; G09G 5/00; H04N 1/387
(52) U.S. Cl. ...................... 382/195; 382/203; 382/180; 345/632; 358/450; 358/453
(58) Field of Search ................................ 382/195, 199, 382/203, 205, 180, 176, 274; 345/581, 582, 619, 626, 629, 630, 632, 641; 358/450, 452, 453, 1.18, 464; 348/584, 586

(56) References Cited

U.S. PATENT DOCUMENTS

| | | | | |
|---|---|---|---|---|
| 5,267,333 A | * | 11/1993 | Aono et al. | 382/166 |
| 5,459,819 A | * | 10/1995 | Watkins et al. | 358/1.18 |
| 5,815,645 A | * | 9/1998 | Fredlund et al. | 358/1.18 |
| 5,825,996 A | * | 10/1998 | Davis et al. | 358/1.18 |
| 5,901,245 A | | 5/1999 | Warnick et al. | 382/190 |
| 5,953,076 A | * | 9/1999 | Astle et al. | 348/584 |
| 5,986,671 A | * | 11/1999 | Fredlund et al. | 345/629 |
| 6,005,972 A | * | 12/1999 | Fredlund et al. | 382/176 |
| 6,069,713 A | * | 5/2000 | Kusama | 358/452 |
| 6,151,009 A | * | 11/2000 | Kanade et al. | 345/641 |
| 6,236,407 B1 | * | 5/2001 | Leban et al. | 345/630 |
| 6,282,317 B1 | * | 8/2001 | Luo et al. | 382/203 |

OTHER PUBLICATIONS

U.S. patent application Ser. No. 09/223,860, Jiebo Luo et al., filed Aug. 28, 2001.
"Digital Image Processing" by Gonzales and Woods. Addison–Wesley, 1992, pp. 583–586.

* cited by examiner

Primary Examiner—Mehrdad Dastouri
(74) Attorney, Agent, or Firm—David M. Woods

(57) ABSTRACT

A method for placing a human understandable item, such as a caption, text or a figurative element, in a digital image includes the steps of (a) digitally processing the digital image to recognize and identify an optimal location in the digital image for placing the item and (b) modifying the placement of the item in relation to human understandable image content so as to minimally obscure such human understandable image content in the digital image. The recognition and identification of an optimal location further includes the identification of an optimal open space region and then finding an optimal location for the item within the open space region. The placement of the item may be done so as to minimally obscure human understandable image content either in other locations of the optimal open space region, or in regions of the digital image adjoining the optimal open space region. Placement of the image may further be based on evaluating the proportion of image pixels in the item that occlude pixels outside of either the optimal location or the optimal region. Moreover, one or more attributes of the item, such as the color, size or shape of the item, may be modified in relation to the human understandable image content in the digital image to enhance the prominence of the item in the digital image.

32 Claims, 5 Drawing Sheets

METHOD FOR AUTOMATIC TEXT PLACEMENT IN DIGITAL IMAGES

FIELD OF THE INVENTION

The invention relates generally to the field of digital image processing and digital image understanding and, more particularly, to the automatic placement of an item such as a figurative element or text within an image.

BACKGROUND OF THE INVENTION

The creation of custom picture postcards or other picture souvenir items often presents a customer with an opportunity to place a text caption, a set of thought bubbles, or a figurative element within a digital image. Currently many systems offering these services such as digital print kiosks or web sites offer a user two options, a fixed location on the image (without regard to image content) or a location chosen by the user. Often the choice of the item's size or color is similarly limited. Conversely, the choices may be essentially limitless if the system offers little or nor guidance to the user. For a great number of people, this can lead to time consuming indecision. Limiting the options of the user may speed up the process, but will frustrate the user if the options offered are not aesthetically pleasing.

U.S. Pat. No. 5,901,245, which issued May 4, 1999 to the assignee of this application, describes a method for detecting open space in an image. The method involves the creation of an activity map for determining the activity of the digital image, and then determining which pixels in the activity map are below a threshold. Open space is identified as contiguous pixels of the activity map having values below the determined threshold. This method identifies regions within the image which are suitable for the inclusion of text or figurative elements into the image. While the location of open space does assist the user in finding an appropriate location in an image for an item, the mere location of an open space region does not ineluctably lead to an aesthetically pleasing use of the space.

Consequently, a need exists to more fully automate the process of placing a desired item within an open space in a given digital image, particularly to render the item and, if necessary, its surroundings to produce an aesthetically pleasing final image.

SUMMARY OF THE INVENTION

The present invention is directed to overcoming one or more of the problems set forth above. Briefly summarized, according to one aspect of the present invention, the invention resides in a method for placing a human understandable item in a digital image including the steps of (a) digitally processing the digital image to recognize and identify an optimal location in the digital image for placing the item and (b) modifying the placement of the item in relation to human understandable image content so as to minimally obscure such human understandable image content in the digital image.

The recognition and identification of an optimal location further includes the identification of an optimal region comprising open space in the digital image and then finding an optimal location within the optimal region. The placement of the item may be done so as to minimally obscure human understandable image content in other locations of the optimal region, or in regions of the digital image adjoining the optimal region. The modified placement of the image may be based on evaluating the proportion of image pixels in the item that occlude pixels outside of either the optimal location or the optimal region. Typical items processed by this method include a caption, text or a figurative element.

Alternately, the invention may be seen to reside in a method for placing a human understandable item in a digital image so as enhance the prominence of the item in relation to human understandable content in the digital image, including the steps of (a) digitally processing the digital image to recognize and identify an optimal location in the digital image for placing the item and (b) modifying one or more attributes of the item in relation to the human understandable image content to enhance the prominence of the item in the digital image. Such attributes include the color, size or shape of the item.

The present invention has the advantage of automatically choosing a set of locations, sizes, and colors for a desired item to be placed within a given digital picture that are aesthetically pleasing, and thereby curtailing the time and effort required by the user for said task.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts.

Still further, as used herein, the computer program may be stored in a computer readable storage medium, which may comprise, for example; magnetic storage media such as a magnetic disk (such as a floppy disk) or magnetic tape;

optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such a personal computer.

Figure 4:
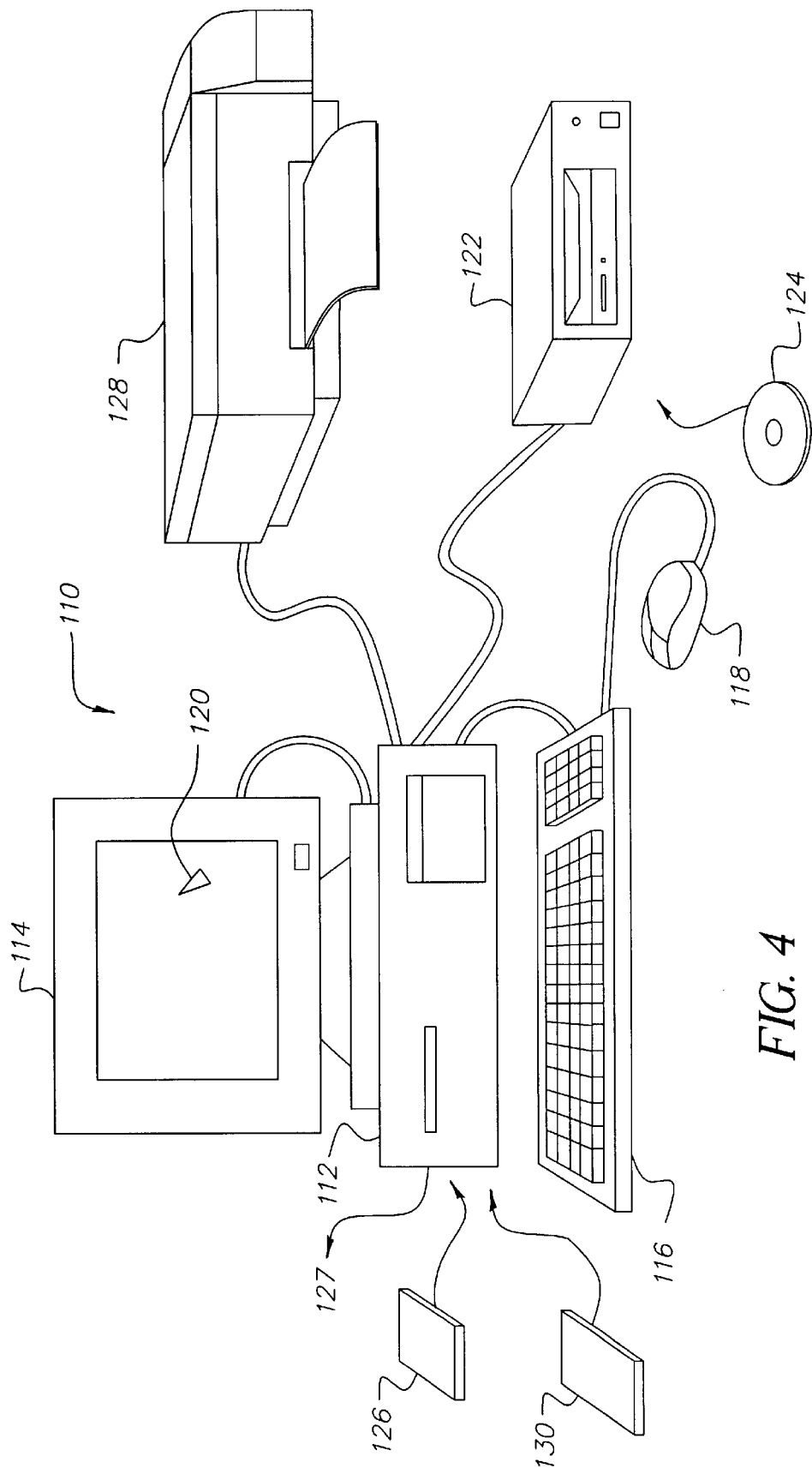
FIG. 4 is a perspective diagram of a computer system for implementing the present invention.

Referring initially to FIG. 4, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing a software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the computer disk 134, or input through the network connection 127, may have been obtained from a variety of sources, such as a digital camera (not shown) that captures an original scene or a scanner (not shown) that scans an original material, such as a silver halide film.

The invention concerns the treatment of human understandable items, such as captions, text or figurative elements, that are suitable for locating within an open space in an image. Captions include titles, such as "Birthday Party". Text would include descriptors, such as (continuing the example) the names of those at the party, while figurative elements would include digital icons or caricatures (e.g., birthday candles), logos, thought bubbles (with text inside), and the like. Such human understandable captions, text, and figurative elements will be referred to together from time to time in this description and the claims as an "item(s)". An "open space", as the term will generally be used herein, is defined as a contiguous region of an image having smoothly varying color (for a color image) or a smoothly varying density (for a monochrome image). Some examples of this are clear blue skies, sandy beaches, or interior walls and ceilings. Mildly textured regions may also be considered to be open spaces such as grassy fields, water, etc. These open space regions often present optimal locations for items that obscure the least image content or information.

Figure 1:
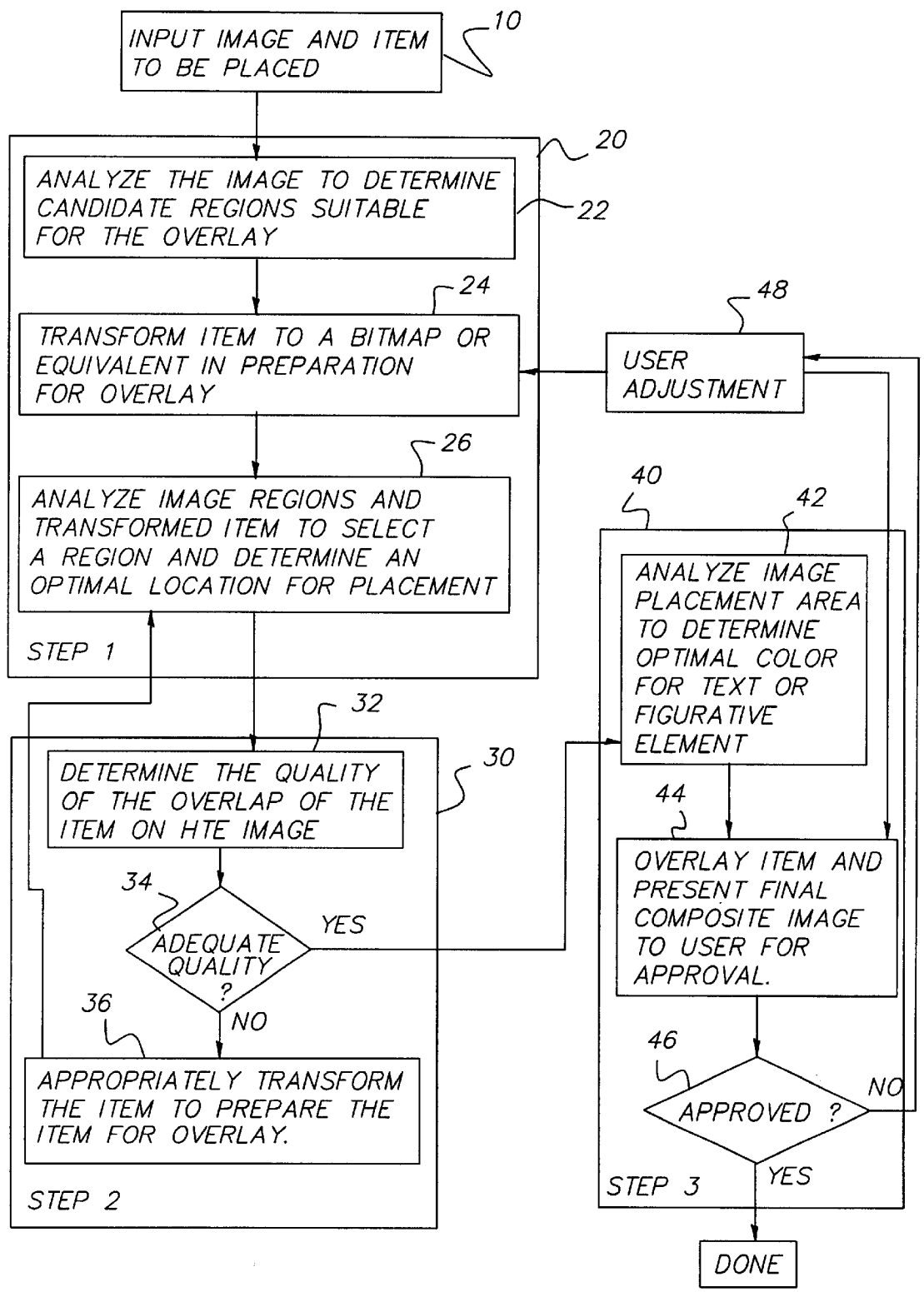
FIG. 1 is a diagram of the steps involved in automatically placing, sizing, and coloring text or figurative items within a digital image in accordance with the invention.

There are several activities involved in the process of automatically placing such human understandable items within regions of images. The item is rendered into a pixel map. Areas of the image suitable for item placement are identified. A suitability function is applied to the identified regions, which provides some indication of the relative value of placing the item in a given location. Of particular concern is the extent to which human understandable image content in the digital image may be obscured by the placement of the item. A color is selected for the item, and then the item is rendered into the image. These activities can be reduced to several stages that are each important in the effective automatic placement of a desired item in a given digital image: Referring to FIG. 1, after an image and an item to be placed in the image are input to the computer 110 in step 10, an optimal region and an optimal location within the region for the placement of an item are established in stage 20. In the second stage 30, the size and/or shape of the item is adapted for optimal placement in the selected optimal location within the selected optimal region, particularly so as to minimally obscure human understandable image content elsewhere in the image. (Note that such minimal obstruction of human understandable content can be accomplished by keeping the item to the extent possible from overlaying into adjacent locations or regions of the image, without actually having to identify the presence of specific human understandable image content in the adjacent regions.) In the final stage 40, adjustments are made to certain attributes of the item, e.g., its color, or to neighboring areas surrounding the item to improve the item's prominence in the resulting image.

Stage 1: An Election of an Optimal Region and an Optimal Location for the Placement of the Item.

In the first stage 20, the input image is automatically analyzed to identify an optimal region and an optimal location (within the optimal region) for the placement of the item. In order to identify such a region, the input image is first analyzed in step 22 to identify its large contiguous regions that do not contain any significant or valuable image content. Such regions are considered candidate regions for the placement of the item, which will typically overlay and occlude image pixels (that are not significant or valuable in terms of image content) that are in the candidate region. According to the preferred embodiment, there are several known methods that may be used for identifying the candidate regions. According to a first method, the input image is analyzed to detect significantly sized open spaces of the image, using the method and algorithm described in the aforementioned U.S. Pat. No. 5,901,245, which is incorporated herein by reference. Such open space regions may be further processed to exclude some regions based upon characteristics such as size, shape, and color which are indicative of image content that should not be occluded or obscured or are otherwise unsuitable for item placement. For example, flesh colored regions, or small regions, may be excluded from further consideration as item locations.

Figure 2:
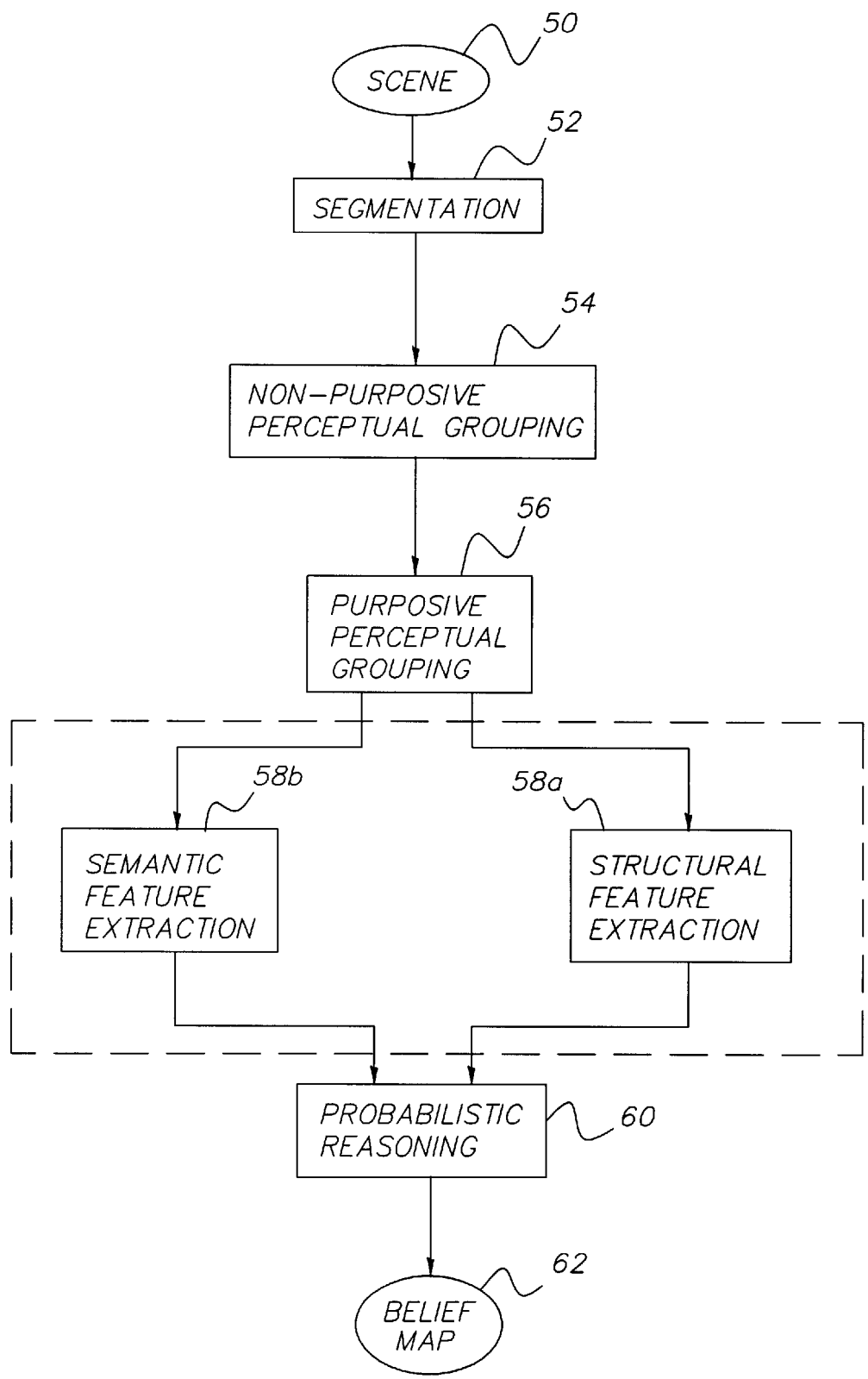
FIG. 2 is a diagram of a method for determining significantly sized contiguous regions in an image that do not contain the main subject, and which may therefore be used as candidate regions for locating items in accordance with the invention.

In a second method for identifying the candidate regions, the given image is analyzed to identify significantly sized contiguous regions not containing the main subject(s). This may be accomplished by employing a main subject detection algorithm, such as the one described in U.S. patent application Ser. No. 09/223,860, filed Dec. 31, 1998 in the name of the assignee of the present application, and which is incorporated herein by reference. Referring to FIG. 2, there is shown a block diagram of an overview of the main subject detection algorithm described in that patent application. First, an input image of a natural scene is acquired and stored in a step 50 in a digital form. Then, the image is segmented in a step 52 into a few regions of homogeneous properties. Next, the region segments are grouped into larger regions based on similarity measures in a step 54 through non-purposive perceptual grouping, and further grouped into larger regions corresponding to perceptually coherent objects in a step 56 through purposive grouping (purposive grouping concerns specific objects). Non-purposive perceptual grouping can eliminate over-segmentation due to large illumination differences, for example, a table or wall with remarkable illumination falloff over a distance. Purposive perceptual grouping is generally based on smooth, noncoincidental connection of joints between parts of the same object, and in certain cases models of typical objects (for example, a person having head, torso and limbs).

The regions are evaluated for their saliency in a step 58 using two independent yet complementary types of saliency features—structural saliency features and semantic saliency features. The structural saliency features, including a set of low-level early vision features and a set of geometric features, are extracted in a step 58a, which are further processed to generate a set of self-saliency features and a set of relative saliency features. Semantic saliency features in the forms of key subject matters, which are likely to be part of either foreground (for example, people) or background (for example, sky, grass), are detected in a step 58b to provide semantic cues as well as scene context cues. In this application, the low-level early vision features include color, brightness, and texture. The geometric features include location (centrality), spatial relationship (borderness, adjacency, surroundedness, and occlusion), size, shape, and symmetry. The semantic features include flesh, face, sky, grass, and other green vegetation. The evidences of both semantic and structural types are integrated in a step 60 using a reasoning engine based on a Bayes net to yield the final belief map of the main subject in a step 62.

Both of the aforementioned methods for identifying the candidate regions can return a binary map containing the candidate regions and non-candidate regions of the given image with, e.g., 1's and 0's assigned to the respective regions. A third method employs both previously identified methods and logically combines the results (binary maps) with, e.g., a Boolean operator, such as ANDing the output of the respective methods. In this method, additional processing of the open space map to exclude, as described above, some regions based upon characteristics such as size, shape, and color may be unnecessary. Whichever method is employed, the binary map of the candidate regions is hereby referred to as the candidate region map.

In preparation for overlay of the desired item(s) into the optimal candidate region, the desired item(s) may need to be transformed into a format compatible with the digital image in step 24. For example, ASCII text may need to be rendered with an appropriate typeface and resolution to produce a pixel map compatible with the digital image. A graphic element may need to be similarly rendered into a pixel map or be scaled to a size compatible with the digital image. This transformation in the step 24 produces a grayscale pixel map representation commonly referred to as an alpha channel. The gray value of each pixel indicates the opacity of the corresponding pixel in the object it represents. The alpha channel representation thus indicates which pixels within the image object are to be overlaid into the digital image and how much they obscure the underlying image.

Figure 3A:
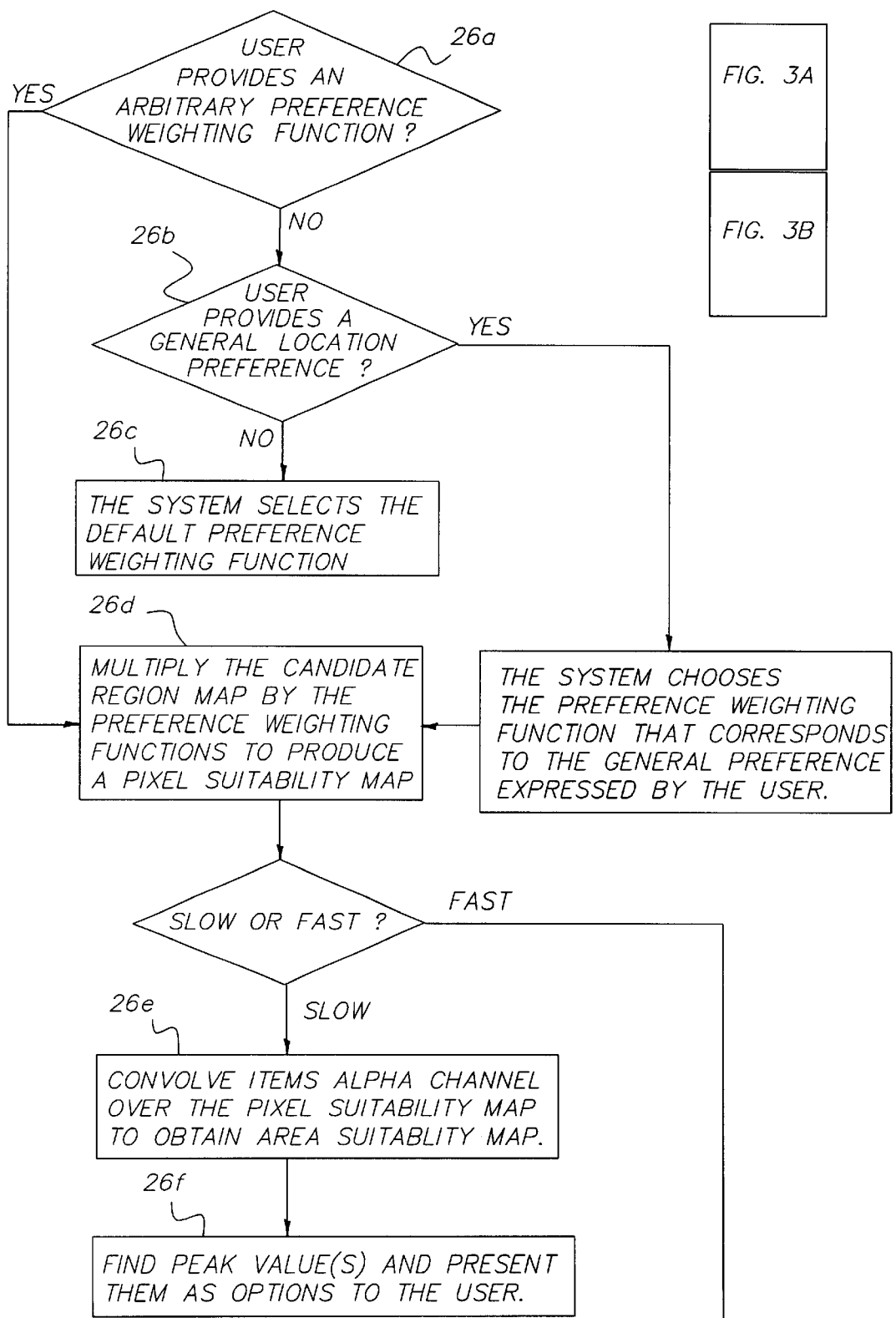
FIGS. 3A and 3B are diagrams of a method for determining an optimal candidate region for locating items according to the invention.
Figure 3B:
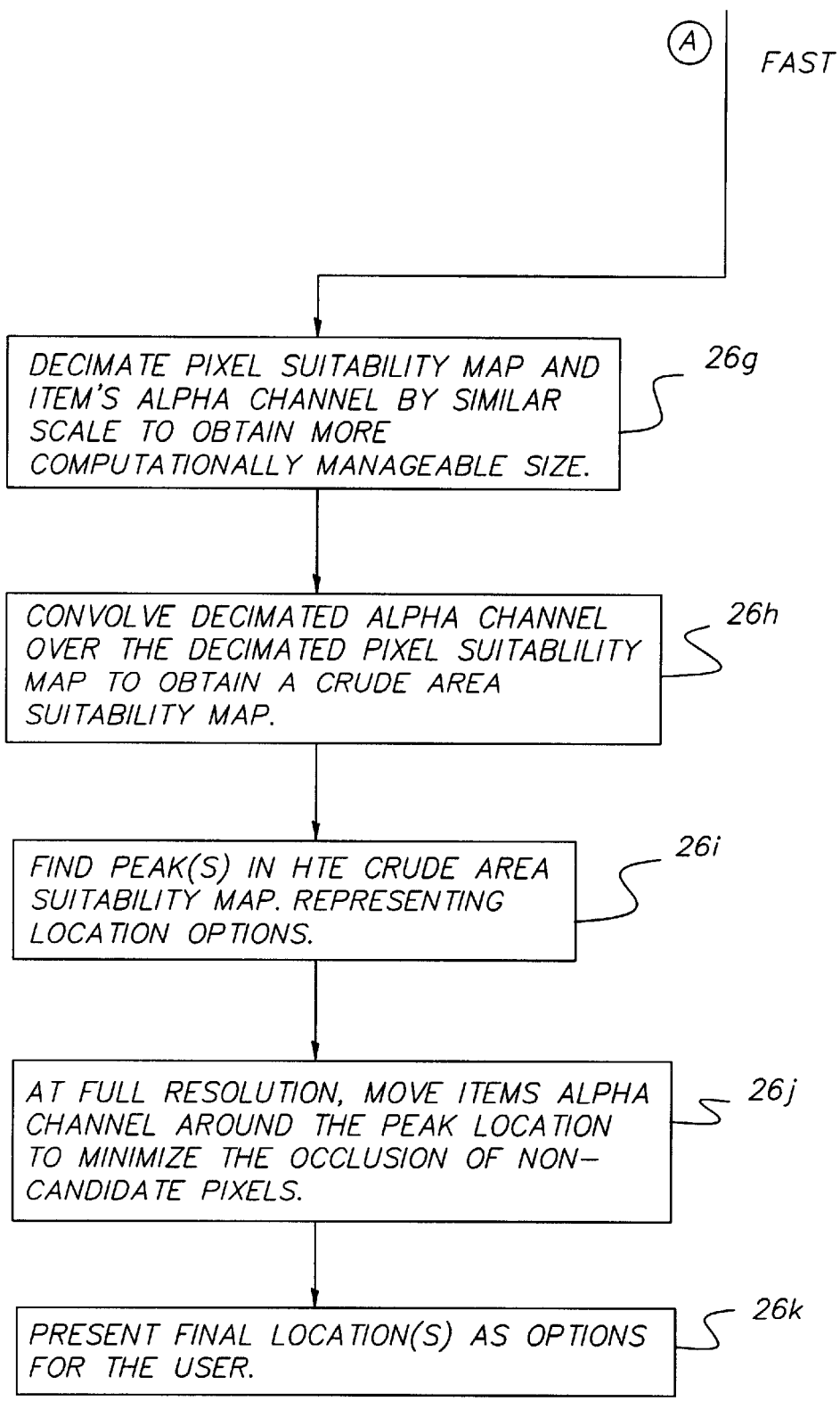

In step 26, one of the detected candidate regions is selected as an optimal region for the placement of the desired item based the following criteria and process as set forth in FIG. 3. In step 26b, the user may indicate a preference for the general location of the placement. For example, the user may specify that the item be placed away from the center of the image, or near one of its corners, etc. In doing so, a specific grayscale weighting function corresponding to the specified location preference may be chosen by the user in a step 26a. If the user does not express a location preference in step 26b, a default location preference and its associated weighting function is chosen a step 26c by the system. The binary candidate region map is multiplied by the grayscale weighting function a step 26d producing a pixel suitability map. This map indicates how suitable each pixel is for item placement. In the preferred embodiment, the higher the suitability value (i.e., brightness) of a pixel, the more suitable it is considered for item placement.

One approach to finding the "best" candidate region and item location can be found by convolving the rendered item alpha channel representation over the pixel suitability map a step 26e to obtain an area suitability map. The area suitability value at a pixel in the area suitability map is the sum of the pixel suitability values covered by the item when the item is placed at that location. The peak value(s) in the area suitability map, which indicate the "best" item location(s), are found in a step 26f. However, even with a modest size item, this convolution operation may become computationally expensive and, depending upon the processing capabilities available for the application, some shortcuts may need to be taken, as follows.

Instead of convolving the alpha channel representation of the item over the full size pixel suitability map, the pixel suitability map and the alpha channel representation are decimated a step 26g by a similar scale to create corresponding representations that are smaller and more computationally manageable. The convolution operation may be performed in a step 26h at this decreased resolution to get a coarse approximation of the "ideal" item location, and peak values are located in a step 26i. Because some of the fine details of the pixel suitability map and the object alpha representation are lost in the decimation process, this coarse approximation of the "ideal" location may need to be refined at full resolution.

Once the initial position has been chosen, the coarse map may be discarded. This initial position is refined at full resolution in a step 26j in order to minimize the occlusion of non-candidate (non-suitable) region pixels by the item. To avoid placing the item adjacent to pixels of non-candidate regions, a morphologically dilated version of the item alpha channel is generated. This dilated alpha channel is placed over the initial position and is moved around the area of the initial position to find the best fit. This best fit search can be performed through convolution, or by iteratively moving the alpha channel representation about in a manner similar to gradient based block matching by correlation (see, e.g., Gonzales and Woods "Digital Image Processing" Addison-Wesley © 1992 Section 9.3.1 pp 583–586). In step 26k, the user has an option to request the next best location or another suitable location in another preferred part of the image. Once a location is found, the position is corrected to account for the dilation differences in size, and the original item mask is placed.

Stage 2: Acceptance or Modification of the Size, and Shape of the Item.

In some cases, the item may have an optimal fit to a certain location in an optimal region and still extend beyond the optimal location or even beyond the optimal region itself and potentially obscure human understandable content in other areas of the optimal region or in regions of the digital image adjoining the optimal region. This may occur, for example, if the digital image does not have any areas of open space large enough for placement of the particular item. Accordingly, in the second stage 30, the item is adapted for placement at the selected optimal location within the selected optimal region by adjustment of its size and/or shape. In order to adjust the size and shape of the item, the quality of the chosen location is measured in step 32 by calculating the percentage of pixels in the item occluding non-candidate region pixels, which may contain human understandable image content that should not be obscured by an item. This percentage of occluded non-candidate region pixels is compared to a threshold in step 34 indicative of an acceptability quality level. If the quality of the fit is deemed insufficient in step 34, and the physical distribution of occluded non-candidate region pixels indicates the fit may improve by transforming the size and/or shape of the image, the item may be transformed in step 36 in a manner that better suits the selected image region. For instance, the item may be made smaller, or if the item is text, the text may be broken into two or more lines.

In the preferred embodiment, a set of predefined rules is employed to transform the item. If the more than 5% of a graphic item's pixels occlude non-candidate region pixels and the preponderance of these occluded pixels occur along the periphery of the item, the item will be subjected to a 3% reduction in size maintaining the proper aspect ratio. Similarly, a text caption may be rerendered at a decreased font size. If a text caption is long and contains words that by themselves exhibit a poor quality of fit, the caption may be broken into two or more lines. If the transformation results in a significant change in the shape of the item, such as breaking a caption into multiple lines, the process may return to step 26.

Stage 3: Selection of Color and Adjustments to Enhance Prominence of the Placed Item.

If the item is a colored graphic element, it may be overlaid into the image without changes to its color. Alternately, if the image consists solely of an alpha channel, or contains some regions within the graphic element for which the color may be assigned, the color of the item or regions of the item can be automatically chosen by the system.

The color of the item may be optionally selected by the user, e.g., in the input step 10, or automatically selected in a subsequent stage. If the color of the item is automatically chosen, it may be chosen to contrast with the selected image region in which the item is located. The color is selected from a palette of colors containing a set of default colors as well as dominant colors found in the image outside the item placement area, or derived to compliment dominant colors found within the item placement area. The automatic color selection process preferably selects a color that results in the highest contrast with the selected region for item placement. The adapted and colored item is then placed in the selected region in step 44 at the selected best location.

In the preferred embodiment, color selection consists of the following steps. Color histograms are constructed of the entire image as well as the area surrounding the item placement location. Dominant colors represented within the whole image histogram are identified as candidate colors. Candidate colors found to be dominant within the histogram of the area surrounding the item placement location are discarded. Candidate colors that do not provide adequate luminance contrast to the item placement area are similarly discarded. The remaining candidates are grouped by hue, and all but the most highly saturated member of each group are discarded. The remaining candidates are added to a list of default colors. The color providing the highest contrast to the surrounding area is selected, and the remaining candidates are retained as options for the user to select.

In the third stage 40, after the item is placed, the color of the area surrounding the item is adjusted in a step 42 to improve the prominence of the placed item in the resulting image. A set of rules is used for this purpose. For example, if a significant number of pixels within an area around the item are of matching or similar colors to the color of the item, then the pixels within an area around the item may be darkened or lightened to force an improvement in contrast or blend. Similarly, the area surrounding the item may be darkened or lightened if the placement region contains too many pixels belonging to non-candidate regions.

The image as finally rendered with the item overlaid into the selected open space region is presented to the user via the display (see FIG. 3) for approval in step 44. If the user indicates approval in step 46 then the job is done; otherwise the process is looped back through a user adjustment step 48 until the item is rendered and overlaid in a manner acceptable to the user/viewer. Two possibilities are illustrated in FIG. 1. If the color of the item is unacceptable, the user may make another color selection in the step 48 and the process returns to step 44—in effect, the user can be presented with a palette of colors and step through them one by one until an acceptable color is found. If the size and/or shape, or the selected location for the overlay, is unacceptable, then the process is returned to step 24 where the item is again transformed in preparation for overlay.

In this situation, the user may desire to provide certain overriding considerations, such as size or typeface as well as a predetermined open space region, in the user adjustment step 48. The process is then repeated until a satisfactory result is obtained.

The subject matter of the present invention is related to digital image understanding technology. The invention has been described with reference to a preferred embodiment. However, it will be appreciated that variations and modifications can be effected by a person of ordinary skill in the art without departing from the scope of the invention.

PARTS LIST 10 input step
20 first stage
22 region location step
24 bitmap transform step
26 optimal selection step
26a weighting function preference
26b location preference step
26c default selection step
26d multiplication step
26e convolution step
26f peak value step
26g decimation step
26h convolution step
26i peak value step
26j refinement step 26k option step
30 second stage
32 quality measurement step
34 quality decision step
36 transformation step
40 third stage
42 color determination step
44 overlay step
46 approval step
48 user adjustment step
50 scene step
52 segmentation step
54 non-purposive grouping step
56 purposive grouping step
58 saliency step
58a structural extraction step
58b semantic extraction step
60 reasoning engine
62 belief map
110 computer system
112 microprocessor-based unit
114 display
116 keyboard
118 mouse
120 selector
122 CD-ROM
124 CD
126 floppy disk
127 network connection
128 printer
130 PC card

What is claimed is:

1. A method for placing a human understandable item in a digital image, said method comprising the steps of:
   (a) automatically analyzing the pixels of the digital image to recognize and identify pixel content indicating a plurality of candidate regions for placement of the human understandable item;
   (b) processing the plurality of candidate regions to exclude one or more regions based upon characteristics including at least one of size, shape and color which are indicative of image content that makes the region unsuitable as a candidate region for item placement, the remaining of said candidate regions comprising contiguous regions in the digital image that do not contain any significant or valuable human understandable image content and are sufficiently large to contain a substantial portion of the human understandable item;
   (c) automatically selecting one of the candidate regions as an optimal location in the digital image for placing the human understandable item;
   (d) modifying the placement of the human understandable item in relation to human understandable image content in the digital image so as to minimally obscure the human understandable image content in the digital image; and
   (e) rendering the digital image with the human understandable item overlaid substantially into the optimal location such that the human understandable image content is spatially unaffected by the overlaid human understandable item.

2. A method as claimed in claim 1 in which step (c) comprises identifying an optimal region comprising open space in the digital image and then finding an optimal location within the optimal region.

3. A method as claimed in claim 2 in which step (d) comprises modifying the placement of the human understandable item in relation to human understandable image content so as to minimally obscure such human understandable image content in other locations of the optimal region.

4. A method as claimed in claim 1 in which step (d) comprises modifying the placement of the human understandable item in relation to human understandable image content so as to minimally obscure such human understandable image content in a region of the digital image adjoining the optimal region.

5. A method as claimed in claim 1 in which step (d) comprises evaluating the proportion of image pixels in the human understandable item that occlude pixels outside of either the optimal location or the optimal region.

6. A method as claimed in claim 1 in which the human understandable items include at least one of a caption, text and a figurative element.

7. A method as claimed in claim 1 further comprising a step (f) of modifying one or more attributes of the human understandable item in relation to the human understandable image content in the digital image to enhance the prominence of the human understandable item in the digital image.

8. A method as claimed in claim 7 in which step (f) comprises modifying one or more attributes of the human understandable item in relation to the human understandable image content in the digital image outside of the optimal location.

9. A method as claimed in claim 7 in which the step (f) of altering one or more attributes of the human understandable item comprises altering at least one of the color, size and shape of the human understandable item.

10. A method for placing a human understandable item in a digital image so as enhance the prominence of the human understandable item in relation to human understandable image content in the digital image, said method comprising the steps of:
    (a) automatically analyzing the pixels of the digital image to recognize and identify pixel content indicating a plurality of candidate regions for placement of the human understandable item;
    (b) processing the plurality of candidate regions to exclude one or more regions based upon characteristics including at least one of size, shape and color which are indicative of image content that makes the region unsuitable as a candidate region for item placement, the remaining of said candidate regions comprising contiguous regions in the digital image that do not contain any significant or valuable human understandable image content and are sufficiently large to contain a substantial portion of the human understandable item;
    (c) automatically selecting one of the candidate regions as an optimal location in the digital image for placing the human understandable item;
    (d) modifying one or more attributes of the human understandable item in relation to the human understandable image content in the digital image to enhance the prominence of the human understandable item in the digital image; and
    (e) rendering the digital image with the human understandable item overlaid substantially into the optimal location such that the human understandable image content is spatially unaffected by the overlaid human understandable item.

11. A method as claimed in claim 10 in which the step (c) comprises identifying an optimal region comprising open space in the digital image and then finding an optimal location within the optimal region.

12. A method as claimed in claim 10 in which step (d) comprises modifying one or more attributes of the human understandable item in relation to the human understandable image content in the digital image outside of the optimal location.

13. A method as claimed in claim 10 in which step (d) comprises modifying at least one of the color, size and shape of the human understandable item to contrast with the human understandable image content.

14. A computer program product for placing a human understandable item in a digital image comprising: a computer readable storage medium having a computer program stored thereon for performing the steps of:
   (a) automatically analyzing the pixels of the digital image to recognize and identify pixel content indicating a plurality of candidate regions for placement of the human understandable item;
   (b) processing the plurality of candidate regions to exclude one or more regions based upon a color characteristic which is indicative of a flesh colored image content that makes the region unsuitable as a candidate region for item placement, the remaining of said candidate regions comprising contiguous regions in the digital image that do not contain any significant or valuable human understandable image content and are sufficiently large to contain a substantial portion of the human understandable item;
   (c) automatically selecting one of the candidate regions as an optimal location in the digital image for placing the human understandable item;
   (d) modifying the placement of the human understandable item in relation to the human understandable image content in the digital image so as to minimally obscure the human understandable image content in the digital image; and
   (e) rendering the digital image with the human understandable item overlaid substantially into the optimal location such that the human understandable image content is spatially unaffected by the overlaid human understandable item.

15. A computer program product as claimed in claim 14 in which step (c) comprises identifying an optimal region comprising open space in the digital image and then finding an optimal location within the optimal region.

16. A computer program product as claimed in claim 15 in which step (d) comprises modifying the placement of the human understandable item in relation to human understandable image content so as to minimally obscure such human understandable image content in other locations of the optimal region.

17. A computer program product as claimed in claim 14 in which step (d) comprises modifying the placement of the human understandable item in relation to human understandable image content so as to minimally obscure such human understandable image content in a region of the digital image adjoining the optimal region.

18. A computer program product as claimed in claim 14 in which step (d) comprises evaluating the proportion of image pixels in the human understandable item that occlude pixels outside of either the optimal location or the optimal region.

19. A computer program product as claimed in claim 14 further comprising a step (f) of modifying one or more attributes of the human understandable item in relation to the human understandable image content in the digital image to enhance the prominence of the human understandable item in the digital image.

20. A computer program product as claimed in claim 19 in which step (f) comprises modifying one or more attributes of the human understandable item in relation to the human understandable image content in the digital image outside of the optimal location.

21. A computer program product as claimed in claim 19 in which the step (f) of altering one or more attributes of the human understandable item comprises altering at least one of the color, size and shape of the human understandable item.

22. A method for automatically placing text or a figurative element within an underlying image area of a digital image so as to minimize the amount of visual image information obscured, the method comprising the steps of:
   (a) processing the pixels of the image to recognize and identify pixel content indicating a contiguous region in the digital image that does not contain any substantial presence of a characteristic indicative of significant or valuable human understandable image content, including a color characteristic indicative of a flesh color, said human understandable image content being part of the underlying image area, thereby identifying a suitable area for placement of the text or figurative element, wherein said text or figurative element is separate and distinct from said human understandable image content;
   (b) determining an optimal location in the digital image within the suitable area for the text or figurative element to be placed;
   (c) determining a goodness of fit within the optimal location for the text or figurative element;
   (d) transforming the text or figurative element based upon the results of step (c) to improve the goodness of fit for the text or figurative element without affecting the spatial location and integrity of said human understandable content;
   (e) determining an optimal color for the text or figurative element based upon the location of the text or figurative element in the image; and
   (f) rendering the digital image with the human understandable item overlaid substantially into the optimal location such that the human understandable image content is spatially unaffected by the overlaid item.

23. A method as claimed in claim 22 wherein step (a) further includes finding open spaces within the image.

24. A method as claimed in claim 22 wherein step (a) further includes finding regions of the image not containing the main subject.

25. A method as claimed in claim 22 wherein step (b) further includes searching the image for the location where the text or figurative element occludes a minimum of significant visual image content.

26. A method as claimed in claim 22 wherein step (d) further includes scaling the text or figurative element.

27. A method as claimed in claim 22 wherein step (d) further includes splitting the text into multiple lines with various justification.

28. A method as claimed in claim 22 wherein step (e) further includes choosing white or black as the color of the text so as to maximize the contrast between the text and the surrounding image area.

29. A method as claimed in claim 22 wherein step (e) further includes choosing a dominant color appearing within the image as the color of the text so as to maximize the contrast between the text and the surrounding image area.

30. A method as in claim 22 wherein step (e) further includes choosing a color of the text so as to maximize the contrast between the text and the surrounding image area.

31. A method for placing a human understandable item in a digital image, said method comprising the steps of:
   (a) digitally processing the digital image to recognize open space regions in the digital image;
   (b) digitally processing the open space regions to exclude one or more open space regions based upon a color characteristic which is indicative of a flesh colored image content that makes the open space region unsuitable as a candidate region for item placement and produce a suitability map that indicates significant sized open space regions suitable for item placement and a user preference for placement of the human understandable item within the digital image;
   (c) digitally processing the suitability map to identify an optimal location in the digital image for placing the human understandable item;
   (d) modifying the placement of the human understandable item in relation to human understandable image content in the digital image so as to minimally obscure the human understandable image content in the digital image; and
   (e) rendering the digital image with the human understandable item overlaid substantially into the optimal location such that the human understandable image content is spatially unaffected by the overlaid human understandable item.

32. A method for placing a human understandable item in a digital image, said method comprising the steps of:
   (a) digitally processing the digital image to recognize a main subject in the digital image by (a1) extracting regions of arbitrary shape and size defined by actual objects in the image, (a2) extracting for each of the regions at least one structural saliency feature and at least one semantic saliency feature, and (a3) integrating the structural saliency feature and the semantic saliency feature using a probabilistic reasoning engine into an estimate of a belief that each region is the main subject;
   (b) producing a suitability map from the belief estimate that indicates significant sized contiguous regions not containing the main subject and a user preference for placement of the human understandable item within the digital image;
   (c) digitally processing the suitability map to identify an optimal location in the digital image for placing the human understandable item;
   (d) modifying the placement of the human understandable item in relation to human understandable image content in the digital image so as to minimally obscure the human understandable image content in the digital image; and
   (e) rendering the digital image with the human understandable item overlaid substantially into the optimal location such that the human understandable image content is spatially unaffected by the overlaid human understandable item.

* * * * *